(12) United States Patent
Rossi

(10) Patent No.: US 8,793,925 B2
(45) Date of Patent: Aug. 5, 2014

(54) ATTACHMENT FOR MULTIPLE HOOK FISHING LURE

(71) Applicant: Innovative Fishing Products, LLC, Dover, DE (US)

(72) Inventor: Wayne M. Rossi, Dover, DE (US)

(73) Assignee: Innovative Fishing Products, LLC, Dover, DE (US)

( * ) Notice: Subject to any disclaimer, the term of this patent is extended or adjusted under 35 U.S.C. 154(b) by 157 days.

(21) Appl. No.: 13/653,632

(22) Filed: Oct. 17, 2012

(65) Prior Publication Data
US 2013/0291423 A1 Nov. 7, 2013

Related U.S. Application Data

(60) Provisional application No. 61/643,202, filed on May 4, 2012.

(51) Int. Cl.
*A01K 85/00* (2006.01)
(52) U.S. Cl.
USPC .......................... 43/42.25; 43/42.37; 43/42.53

(58) Field of Classification Search
USPC ............ 43/42.25, 42.53, 42.37, 42.29, 42.28, 43/42.24
See application file for complete search history.

(56) References Cited

U.S. PATENT DOCUMENTS

| | | | |
|---|---|---|---|
| 5,386,658 A * | 2/1995 | Ferguson et al. | 43/42.25 |
| 5,491,927 A | 2/1996 | Ortiz | |
| 5,709,047 A | 1/1998 | Link | |
| 5,899,015 A * | 5/1999 | Link | 43/42.39 |
| 5,960,580 A | 10/1999 | Link | |
| 6,418,659 B1 | 7/2002 | Shelton | |
| 6,598,336 B2 | 7/2003 | Link | |
| 7,647,722 B2 * | 1/2010 | Shelton et al. | 43/42.53 |
| 8,196,336 B2 * | 6/2012 | Nicholson, III | 43/42.24 |
| 8,434,258 B2 * | 5/2013 | Greene et al. | 43/42.53 |

* cited by examiner

*Primary Examiner* — Christopher P Ellis
(74) *Attorney, Agent, or Firm* — Schwartz Law Firm, P.C.

(57) ABSTRACT

A hook attachment is adapted for an artificial fishing lure having multiple integrally-joined hooks. The hook attachment includes a lure dressing, and a dressing harness carrying the lure dressing. The dressing harness has a plurality of pre-formed hook holes adapted for receiving respective points of the multiple hooks, such that the hook attachment resides adjacent respective bends of the multiple hooks and extends outwardly from a tail end of the fishing lure.

20 Claims, 4 Drawing Sheets

ATTACHMENT FOR MULTIPLE HOOK FISHING LURE

TECHNICAL FIELD AND BACKGROUND OF THE INVENTION

This invention relates broadly and generally to the fishing industry, and more particularly to a hook attachment and method for dressing an artificial fishing lure having multiple integrally-joined hooks.

In terms of recreational fishing, a "lure" is a commonly known and understood reference to any one or more objects attached to a fishing line and designed to resemble and move like an item of fish prey. The basic purpose of the lure is to use movement, vibrations, and/or color to catch the fish's attention and to entice the fish to "bite" the hook. Conventional lures may be equipped with one or more exposed single, double, or treble hooks. Such lures are generally used with a fishing rod and fishing reel. When a lure is used for casting, it is continually cast out and retrieved—the retrieval making the lure "swim" through the water. The concept of the present disclosure may be utilized in combination with many different types of lures, including (e.g.) jigs, surface lures, spoon lures, plugs, artificial flies, spinnerbaits and swimbaits.

SUMMARY OF EXEMPLARY EMBODIMENTS

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a hook attachment for an artificial fishing lure having multiple integrally-joined hooks. The hook attachment includes a lure dressing, such as any fish-attracting object, and a dressing harness carrying the lure dressing. The dressing harness comprises a plurality of pre-formed hook holes adapted for receiving respective points of the multiple hooks, such that the hook attachment resides adjacent respective bends of the multiple hooks and extends outwardly from a tail end of the fishing lure.

The term "artificial fishing lure" is defined broadly herein to mean any manmade device used alone, or in combination with other live, naturally occurring, or manmade devices, elements, or structure, for purposes of attracting and/or catching fish. Examples of common fishing lures include (but are not limited to) jigs, surface lures, spoon lures, plugs, artificial flies, spinnerbaits and swimbaits. Additionally, a double or treble hook or other hook combination, alone or together with other accessories or dressings, comprises a fishing lure as broadly defined herein.

The term "integrally-joined hooks" is used herein to mean a plurality of hooks and/or hook parts joined together by brazing or banding the shanks, welding, or the like.

The term "lure dressing" refers broadly herein to mean any fish-attracting object or lure accessory including, for example, feathers, bucktail, fishing skirts, nylon weed guards, rattle chambers, natural (live) and artificial baits, and the like.

The term "pre-formed hook hole" refers to any shaped opening or perforation defined in or by the dressing harness, or any pre-formed area of reduced strength or thickness designed for being penetrated by a point of the hook.

According to one exemplary embodiment, the lure dressing comprises a silicone rubber fishing skirt.

According to another exemplary embodiment, the fishing skirt comprises a multiplicity of elongated flexible strands.

According to another exemplary embodiment, the fishing skirt comprises a centrally-disposed female fitting (e.g., flat ring defining recess, socket or opening).

According to another exemplary embodiment, the dressing harness comprises a winged connector having a centrally-disposed male fitting (e.g., elongated post or the like) mated with the female fitting of the fishing skirt. The exemplary connector may be fabricated of any suitable flexible, semi-flexible, or rigid material.

According to another exemplary embodiment, the winged connector comprises a plurality of elongated integrally formed flexible hook-receiving wings diverging from each other, and defining respective pre-formed hook holes of the dressing harness. The flexible wings of the exemplary connector may be integrally molded together as a single homogenous unit.

According to another exemplary embodiment, the winged connector comprises at least three equally-spaced, hook-receiving wings.

According to another exemplary embodiment, the winged connector consists of three equally-spaced, hook-receiving wings.

According to another exemplary embodiment, the winged connector is constructed of a durable and substantially flexible material.

In another exemplary embodiment, the present disclosure comprises the combination of a hook attachment and an artificial fishing lure having multiple integrally-joined hooks. The hook attachment includes a lure dressing, and a dressing harness carrying the lure dressing. The dressing harness comprises a plurality of pre-formed hook holes adapted for receiving respective points of the multiple hooks, such that the hook attachment resides adjacent respective bends of the multiple hooks and extends outwardly from a tail end of the fishing lure.

In yet another exemplary embodiment, the present disclosure comprises a method for dressing an artificial fishing lure having multiple integrally-joined hooks. The method includes inserting respective points of the multiple hooks through pre-formed hook holes in a dressing harness carrying lure dressing of a hook attachment, and locating the hook attachment adjacent respective bends of the multiple hooks such that the lure dressing extends outwardly from a tail end of the fishing lure.

BRIEF DESCRIPTION OF THE DRAWINGS

Exemplary embodiments of the present invention will hereinafter be described in conjunction with the following drawing figures, wherein like numerals denote like elements, and wherein.

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
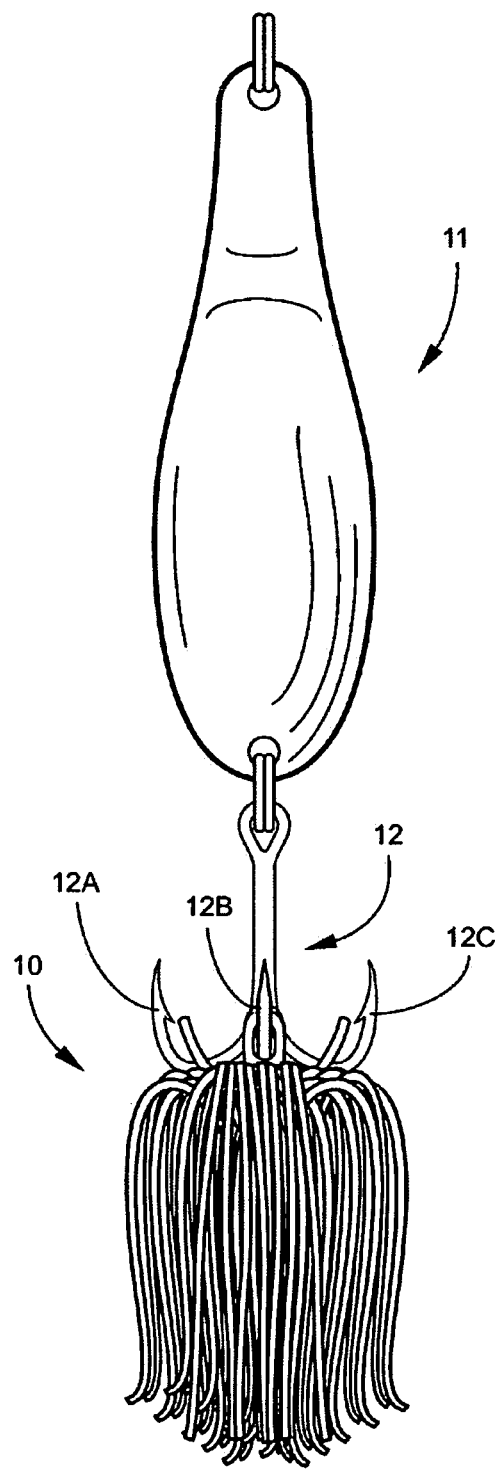
FIG. 1 is a view of the hook attachment according to one exemplary embodiment of the present disclosure, and showing the attachment used in combination with an artificial treble-hook fishing lure.

Referring now specifically to the drawings, a hook attachment according to one exemplary embodiment of the present disclosure is illustrated in FIG. 1, and shown generally at broad reference numeral 10. The exemplary attachment 10 is applicable for use in combination with an artificial fishing lure 11. In the embodiment shown, the fishing lure 11 includes a bare or otherwise "undressed" conventional treble hook 12. The treble hook 12 (best shown in FIG. 4) comprises three metal hooks 12A, 12B, 12C integrally-joined together, such as by brazing or banding the shanks, welding, or the like, and having a common eye 14, and respective elongated shanks 15, and evenly spaced bends 16 and points 17. The points 17 may or may not be barbed. The hook attachment 10 of the exemplary disclosure is designed for being readily applied to and removed from the treble hook 12 to "dress" the lure 11 as desired by the user.

Figure 2:
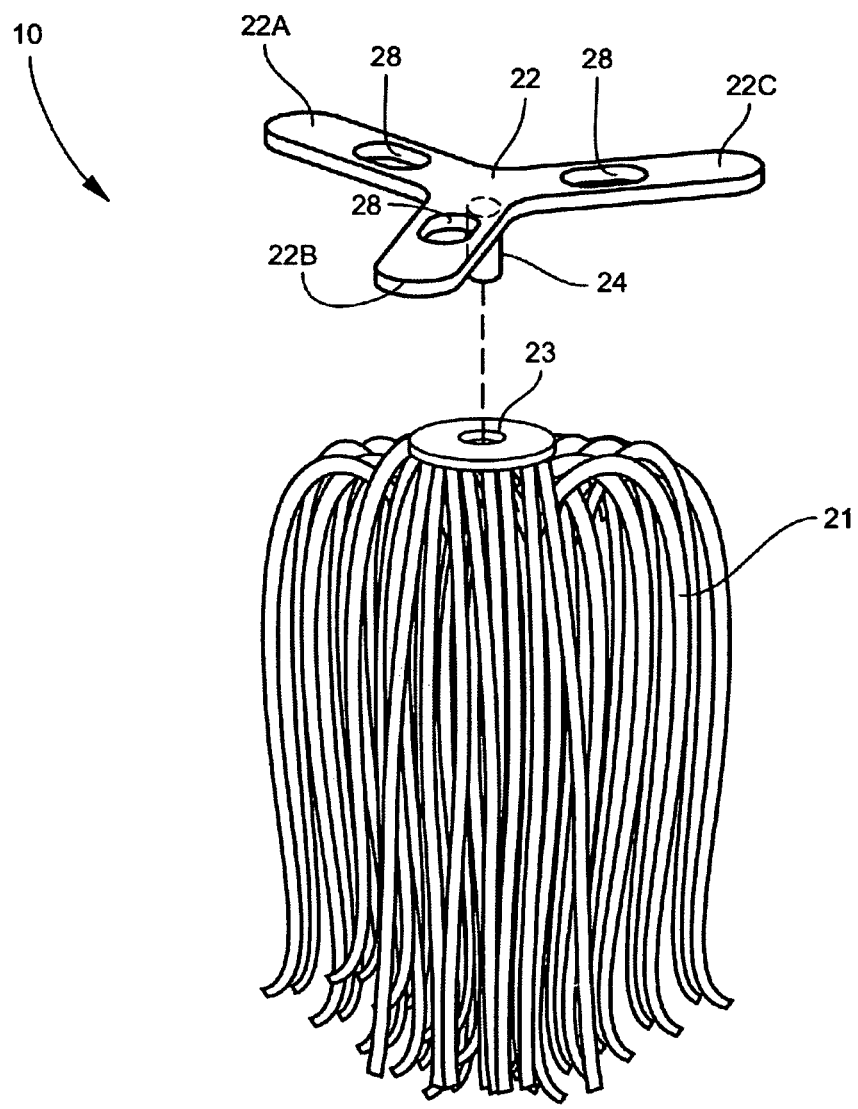
FIG. 2 is a perspective view of the exemplary hook attachment with the fishing skirt and skirt harness separated to illustrate respective fittings provided to interconnect the components during manufacture.
Figure 3:
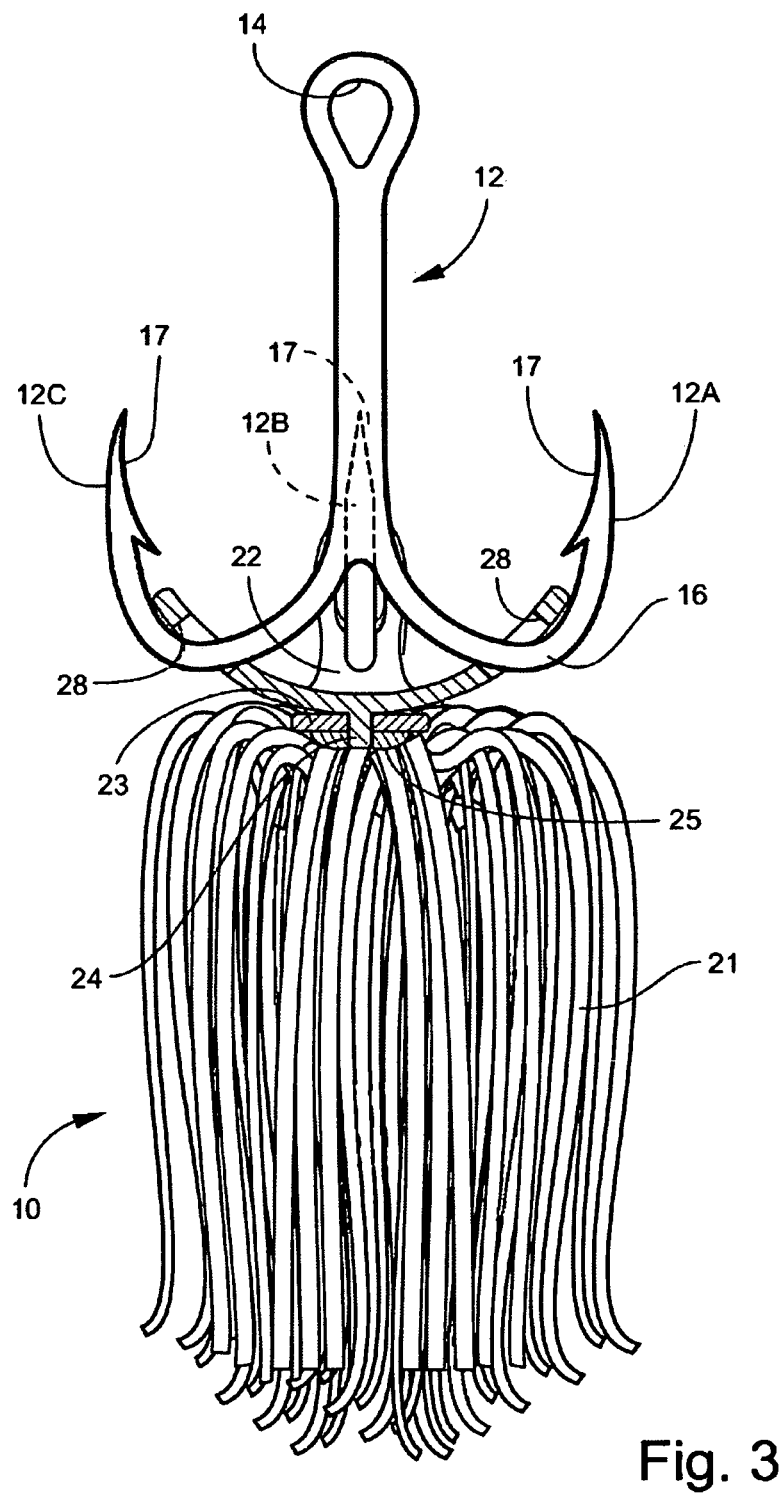
FIG. 3 is a view of the hook attachment secured to the treble hook of the fishing lure, and showing portions of the attachment in cross-section.

Referring to FIGS. 2 and 3, the exemplary hook attachment 10 comprises an interconnected fishing skirt 21 and skirt harness 22. The fishing skirt 21 and harness 22 have complementary female and male fittings 23, 24 which are mated, as best shown in FIG. 3, and permanently attached together by an epoxy resin 25. Other suitable attachment means may comprise rubber adhesives and other bonding agents, heat fusing, or integrally molding the components or parts of the components together. In alternative embodiments (not shown), the skirt 21 and harness 22 may be detachably connected to one another, and readily exchanged and replaced. The fishing skirt 21 may comprise multiple flexible coalesced strands of nonstick synthetic elastomeric polymer, such as silicone rubber. The strands may be formed in a variety of colors, or may be substantially clear or colorless.

Figure 4:
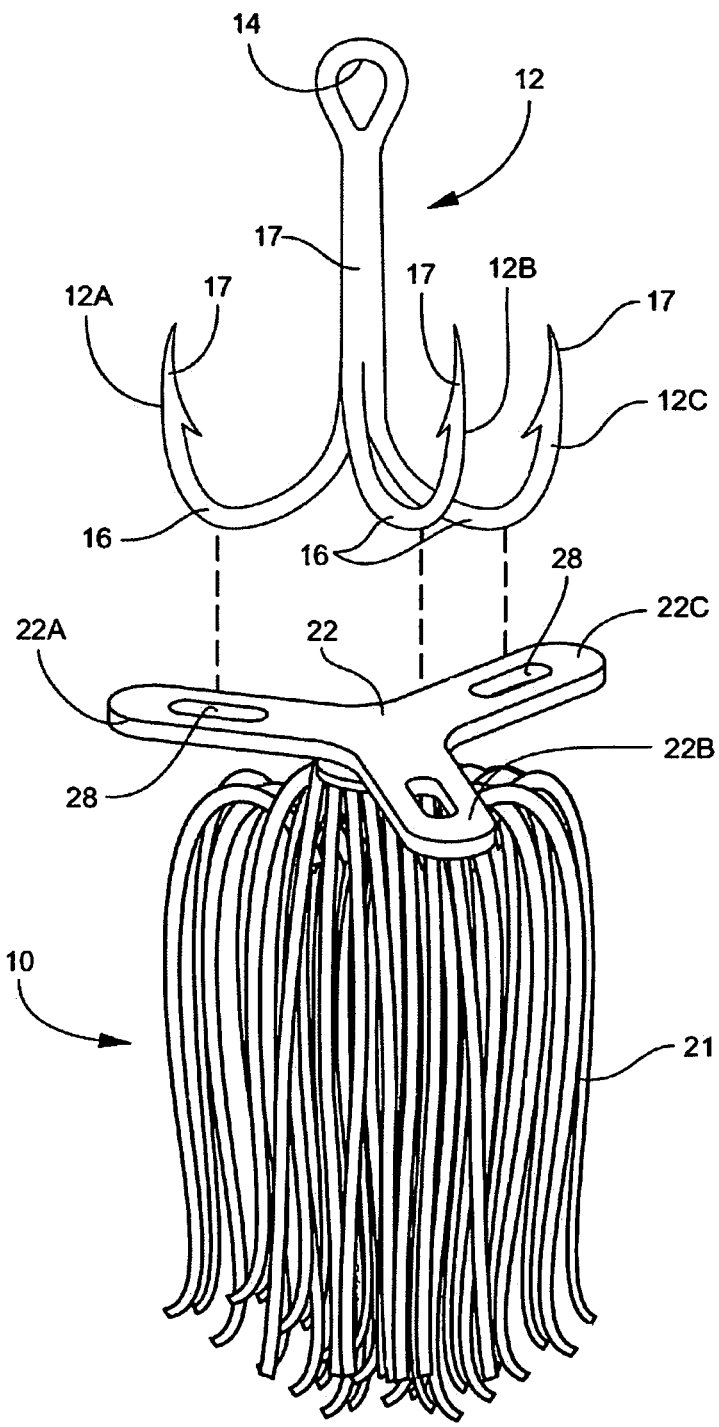
FIG. 4 is a perspective view of the hook attachment removed from the treble hook of the fishing lure.

As best shown in FIGS. 2 and 4, the exemplary skirt harness 22 comprises a winged connector including integrally-molded and radially diverging flexible wings 22A, 22B, 22C. The flexible wings 22A, 22B, 22C have identical dimensions and shape. In the exemplary embodiment, the flexible wings 22A, 22B, 22C are equally spaced apart from one another, and define pre-formed hook holes 28 which loosely receive respective points 17 of the treble hook 12. The "tri-winged" harness 22 may be applied to the treble hook 12 by inserting the point 17 of each metal hook 12A, 12B, 12C one-at-a-time through its corresponding wing hole 28, such that the skirt 21 depends from a tail end of the fishing lure 11. The wing holes 28 of the exemplary attachment 10 may have a substantially round, square, oval, or slotted shape, and are sufficiently large to enable ready application and removable of the harness 22 to and from the treble hook 12, but sufficiently small to effectively secure the attachment 10 to the hook 12 during use. The exemplary harness 22 may be fabricated of any suitably strong and durable material, including elastomeric polymers [such as latex, urethane, and natural and synthetic rubbers], thermoplastics [such as polyethylene, polypropylene, polystyrene, polycarbonate, polyvinyl chloride, and polytetrafluoroethylene (PTFE)], other flexible or rigid moldable compositions, metals, fabric, and the like.

Once the present attachment 10 is applied to the hook 12, the fisherman can now cast the lure 11 in the normal fashion and retrieve as usual. The skirt 21 wiggles and flows at the tail end of the lure 11, causing fish to be enticed in a manner known and understood in the industry. Should the fisherman desire to change the presentation of the lure 11 by adding color, or changing its size and/or motion, he can select an alternate attachment and follow the process described above to readily remove the existing attachment 10 and install the new one.

In other exemplary embodiments (not shown), the present hook attachment may be modified for use on single or double hooks and other combination hooks having one or more points. The hook attachment may be used in combination with any type or style fishing lure, and in combination with any variety of lure dressings and accessories. The hook attachment, metal hook or hooks, and lure may be fabricated in any desired size and material, and all such variations are considered within the scope of the present invention.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

What is claimed:

1. A hook attachment for an artificial fishing lure having multiple integrally-joined hooks, said hook attachment comprising:
    a lure dressing; and
    a dressing harness carrying said lure dressing, and comprising a plurality of pre-formed hook holes adapted for receiving respective points of the multiple hooks, such that said hook attachment resides adjacent respective bends of the multiple hooks and extends outwardly from a tail end of the fishing lure.

2. The hook attachment according to claim 1, wherein said lure dressing comprises a fishing skirt.

3. The hook attachment according to claim 2, wherein said fishing skirt comprises a multiplicity of elongated flexible strands.

4. The hook attachment according to claim 3, wherein said fishing skirt comprises a centrally-disposed female fitting.

5. The hook attachment according to claim 4, wherein said dressing harness comprises a winged connector having a centrally-disposed male fitting mated with the female fitting of said fishing skirt.

6. The hook attachment according to claim 1, wherein said dressing harness comprises a plurality of elongated integrally formed hook-receiving wings diverging from each other, and defining respective pre-formed hook holes of said dressing harness.

7. The hook attachment according to claim 6, wherein said winged connector comprises at least three equally-spaced, hook-receiving wings.

8. The hook attachment according to claim 6, wherein said winged connector consists of three equally-spaced, hook-receiving wings.

9. The hook attachment according to claim 6, wherein said winged connector is constructed of a substantially flexible material.

10. In combination with an artificial fishing lure having multiple integrally-joined hooks, a hook attachment comprising:
    a lure dressing; and
    a dressing harness carrying said lure dressing, and comprising a plurality of pre-formed hook holes adapted for receiving respective points of the multiple hooks, such that said hook attachment resides adjacent respective bends of the multiple hooks and extends outwardly from a tail end of the fishing lure.

11. The combination according to claim 10, wherein said lure dressing comprises a fishing skirt.

12. The combination according to claim 11, wherein said fishing skirt comprises a multiplicity of elongated flexible strands.

13. The combination according to claim 12, wherein said fishing skirt comprises a centrally-disposed female fitting.

14. The combination according to claim 13, wherein said dressing harness comprises a winged connector having a centrally-disposed male fitting mated with the female fitting of said fishing skirt.

15. The combination according to claim 10, wherein said dressing harness comprises a plurality of elongated integrally formed hook-receiving wings diverging from each other, and defining respective pre-formed hook holes of said dressing harness.

16. The combination according to claim 15, wherein said winged connector comprises at least three equally-spaced, hook-receiving wings.

17. The combination according to claim 15, wherein said winged connector consists of three equally-spaced, hook-receiving wings.

18. The combination according to claim 15, wherein said winged connector is constructed of a substantially flexible material.

19. A method for dressing an artificial fishing lure having multiple integrally-joined hooks, said method comprising:
    inserting respective points of the multiple hooks through pre-formed hook holes in a dressing harness carrying a lure dressing of a hook attachment; and
    locating the hook attachment adjacent respective bends of the multiple hooks such that the lure dressing extends outwardly from a tail end of the fishing lure.

20. The method according to claim 19, wherein the lure dressing comprises a fishing skirt.

* * * * *